(12) United States Patent
Hurewitz et al.

(10) Patent No.: US 7,376,912 B2
(45) Date of Patent: May 20, 2008

(54) INTERACTIVE USER INTERFACE FOR DISPLAYING SUPPLY CHAIN INFORMATION

(75) Inventors: Barry Hurewitz, New York, NY (US); Vaughn Harvey, New York, NY (US)

(73) Assignee: Morgan Stanley, New York, NY (US)

( * ) Notice: Subject to any disclaimer, the term of this patent is extended or adjusted under 35 U.S.C. 154(b) by 657 days.

(21) Appl. No.: 10/809,776

(22) Filed: Mar. 25, 2004

(65) Prior Publication Data

US 2005/0216861 A1    Sep. 29, 2005

(51) Int. Cl.
 G06F 3/048 (2006.01)
 G06F 7/00 (2006.01)
 G06F 15/02 (2006.01)

(52) U.S. Cl. .............. 715/804; 715/841; 715/810; 715/783; 715/835; 715/764; 715/968; 715/205; 707/104.1; 705/10

(58) Field of Classification Search ........ 715/775, 715/841, 804, 810, 803, 783, 835, 764, 968, 715/501.1, 514, 822, 821, 205, 20; 707/104.1; 705/10, 7
 See application file for complete search history.

(56) References Cited

U.S. PATENT DOCUMENTS

| | | | | |
|---|---|---|---|---|
| 5,295,242 A | * | 3/1994 | Mashruwala et al. | 715/853 |
| 5,408,655 A | * | 4/1995 | Oren et al. | 715/501.1 |
| 5,493,658 A | * | 2/1996 | Chiang et al. | 715/709 |
| 5,539,872 A | * | 7/1996 | Mintz et al. | 715/810 |
| 5,546,529 A | * | 8/1996 | Bowers et al. | 715/848 |
| 5,594,899 A | * | 1/1997 | Knudsen et al. | 707/2 |
| 5,708,787 A | * | 1/1998 | Nakano et al. | 715/841 |
| 5,786,818 A | * | 7/1998 | Brewer et al. | 715/822 |
| 5,801,702 A | * | 9/1998 | Dolan et al. | 715/854 |
| 5,920,315 A | * | 7/1999 | Santos-Gomez | 715/792 |
| 5,940,820 A | * | 8/1999 | Kagiwada | 707/3 |
| 6,177,936 B1 | * | 1/2001 | Cragun | 715/760 |
| 6,334,131 B2 | * | 12/2001 | Chakrabarti et al. | 707/10 |
| 6,338,067 B1 | * | 1/2002 | Baker et al. | 707/100 |
| 6,363,353 B1 | * | 3/2002 | Chen | 705/10 |
| 6,577,304 B1 | * | 6/2003 | Yablonski et al. | 345/419 |
| 6,631,363 B1 | | 10/2003 | Brown et al. | |
| 6,633,910 B1 | | 10/2003 | Rajan et al. | |
| 6,711,589 B2 | * | 3/2004 | Dietz | 707/104.1 |
| 7,007,029 B1 | * | 2/2006 | Chen | 707/100 |
| 7,017,121 B1 | * | 3/2006 | Gikas et al. | 715/804 |
| 7,149,698 B2 | * | 12/2006 | Guheen et al. | 705/1 |

(Continued)

Primary Examiner—Kieu D. Vu
Assistant Examiner—Nicholas S Ulrich
(74) Attorney, Agent, or Firm—Kirkpatrick & Lockhart Preston Gates Ellis LLP (57) ABSTRACT

An interactive user interface is disclosed. According to various embodiments, the interface includes a first field and at least one additional field. The first field lists a focal item and the at least one additional field contains a listing of items related to the focal item. Certain of the related items in the at least one additional field include a hyperlink which, when activated by the user, causes the item corresponding to the activated hyperlink to become a new focal item listed in the first field, such that the at least one additional field transitions to list items related to the new focal item. The focal item may be, for example, an identifier corresponding to a company, and the at least one additional field may contain a listing of identifiers corresponding to companies that are customers, suppliers or competitors of the focal item company.

46 Claims, 5 Drawing Sheets

U.S. PATENT DOCUMENTS

| | | |
|---|---|---|
| 7,188,317 B1 * | 3/2007 | Hazel .................. 715/804 |
| 2002/0099598 A1 * | 7/2002 | Eicher et al. ............. 705/11 |
| 2003/0004929 A1 * | 1/2003 | Julian et al. .............. 707/2 |
| 2003/0046214 A1 * | 3/2003 | Menninger ............... 705/37 |
| 2003/0117443 A1 * | 6/2003 | Langner et al. .......... 345/810 |
| 2003/0160829 A1 * | 8/2003 | Miksovsky et al. ...... 345/804 |
| 2004/0068431 A1 * | 4/2004 | Smith et al. ............. 705/10 |
| 2005/0021425 A1 | 1/2005 | Casey |
| 2005/0108024 A1 | 5/2005 | Fawcett, Jr. et al. |
| 2005/0108262 A1 | 5/2005 | Fawcett, Jr. et al. |
| 2005/0210406 A1 * | 9/2005 | Biwer et al. ............. 715/804 |
| 2005/0265083 A1 | 12/2005 | Perry |
| 2006/0178918 A1 | 8/2006 | Mikurak |

\* cited by examiner

INTERACTIVE USER INTERFACE FOR DISPLAYING SUPPLY CHAIN INFORMATION

BACKGROUND OF INVENTION

The present invention is directed generally to systems and methods for presenting supply chain information interactively.

In the financial services industry, the value of information decays rapidly. As a result, value for an investor can be created by compressing the response time by the investor (or a manager of the investor's assets) to important news. For example, if a company announces plans to enter bankruptcy protection, it may be valuable to an investor to quickly consider its positions on suppliers, creditors, customers and/or competitors of the bankrupt company in response to the news—before others can act on it. Determining the suppliers, creditors, customers and competitors of a company, however, in a rapid fashion—rapid enough to maximize or increase value to the investor—is not always possible. In the past, investors have relied on institutional knowledge of these interdependencies and relationships, or have relied on paper charts of the information. Such mechanisms are often inaccurate, outdated, cumbersome, static and/or incomplete. Therefore, there exists a need for a manner in which an investor can quickly and interactively navigate through an industry's supply chain to see key interdependencies and relationships between the spectrum of participants.

SUMMARY OF THE INVENTION

In one general aspect, various embodiments of the present invention are directed to an interactive user interface. The interface may include a first field and at least one additional field. The first field lists a focal item and the at least one additional field contains a listing of items related to the focal item. Certain of the related items in the at least one additional field include a hyperlink which, when activated by the user, causes the item corresponding to the activated hyperlink to become a new focal item listed in the first field, such that the at least one additional field transitions to list items related to the new focal item.

According to various implementations, the focal item may be an identifier corresponding to a company and the at least one additional field may contain a listing of identifiers corresponding to companies that are customers, suppliers or competitors of the focal item company. In this way, the user may interactively navigate through the supply chain for a company to ascertain, for example, key interdependencies that may be valuable in providing timely investing advice. For example, the user could navigate three or more derivatives up, down, or across the supply chain very quickly and discern the impact of market moves on players several orders down or upstream. In other variations, the focal item may be an economic indicator and the at least one additional field may list companies whose stock prices are known to be heavily affected by changes in the particular economic indicator.

In another general aspect, various embodiments of the present invention are directed to a system for providing the interactive user interface to the user. The system comprises a database for storing data about the items (e.g., companies) and a server in communication with the database. The server may serve a document containing the interactive user interface via a network to the user. The interactive user interface may include, as before, a first field and at least one additional field. The first field lists a focal item and the at least one additional field contains a listing of items related to the focal item. Certain of the related items in the at least one additional field include a hyperlink which, when activated by the user, causes the item corresponding to the activated hyperlink to become a new focal item listed in the first field, such that the at least one additional field transitions to list items related to the new focal item.

In yet another general aspect, various embodiments of the present invention are directed to a method of presenting or displaying data in an interactive user interface to a user. The method may include displaying a first page. The first page may include the interactive user interface, including a focal item in a first field and a listing of items related to the focal item in the at least one additional field, wherein certain of the related items include a hyperlink. In addition, the method may include displaying a second page when the user activates one of the hyperlinks of the first page. The second page may include a revised version of the interface, wherein the item corresponding to the activated hyperlink in the first page is the new focal item. The second page may further include, as before, a listing of new items related to the new focal item in the at least one additional field, wherein certain of the new related items in the second page include a hyperlink. In an extension of this technique, the user could continually and quickly jump to new pages, each with a new focal item, to thereby quickly move through a variety of pages and learn the interdependencies and business relationships for each of the various focal items.

DESCRIPTION OF THE FIGURES

Embodiments of the present invention are described below by way of example in conjunction with the following figures, wherein.

DESCRIPTION OF THE INVENTION

Figure 1:
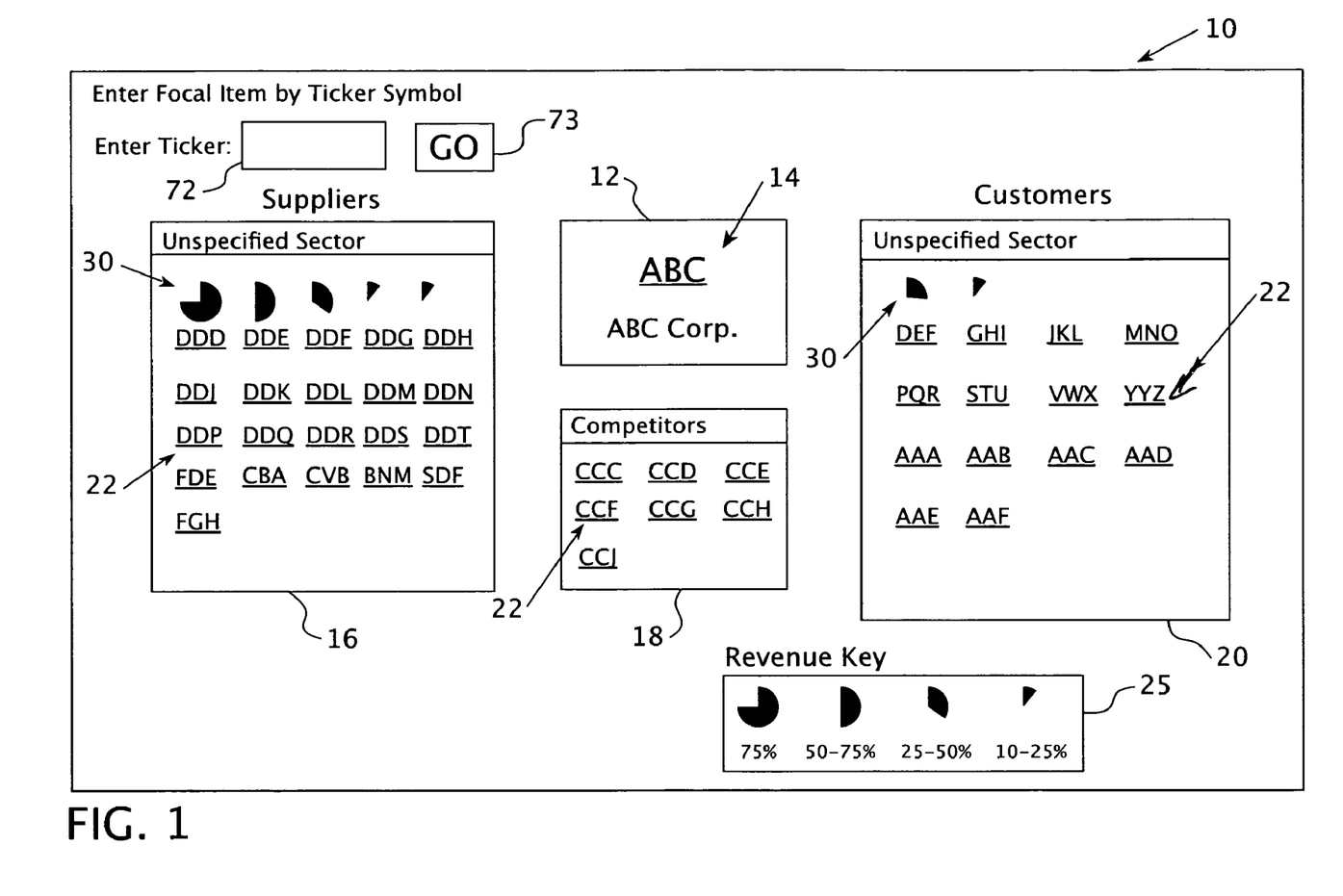
FIGS. 1-3 and 5 are diagrams of an interactive user interface according to various embodiments of the present invention.

FIG. 1 is a diagram of an interactive user interface 10 according to various embodiments of the present invention. The user may be presented with the interface 10, as described further below in connection with FIG. 4, using a computing device (not shown) having a monitor and web browsing software to display the interface 10 based on pages from a server.

As can be seen in the illustrated embodiment of FIG. 1, the interface 10 includes a field 12 positioned toward the center of the interface 10 and which is populated with an item 14. The item 14 may be, for example, an identification of a business entity, such as the stock trading symbol for the business. The user may enter the information for the item 14 or may select it in response to a search query. According to other variations, the item 14 may be, for example, a parameter, such as an economic indicator, including CPI, GNP, etc.

The interface also includes additional fields 16, 18, 20. These additional fields 16, 18, 20 may list items 22 that are related to the item 14 in the field 12. The items 22 may also be an identification of a business entity, such as the stock trading symbol for the business. Because the items 22 listed in the fields 16, 18, 20 are related to the item 14 in the field, the item 14 is sometimes referred to hereinafter as the "focal item."

For an interface 10 where the focal item 14 identifies a business entity, the additional fields 16, 18, 20 may list, for example, suppliers, competitors and customers, respectively, of the focal item 14. According to other embodiments, the interface 10 may include more or fewer fields listing items related to the focal item. Additional fields that may be used, for example, are fields that list creditors, debtors, joint venture partners, etc. of the focal item 14.

Different parameters may be used to determine the items 22 listed in the additional fields 16, 18, 20. For example, according to one embodiment, suppliers and customers of the focal item 14 may be determined based on revenue. That is, for example, each of the items 22 listed in supplier's field 16 may indicate companies that derive a threshold amount (such as 5%) of their revenue through sales to the focal item 14. Similarly, the focal item 14 may derive a threshold amount (such as 5%) of its revenues through sales to companies indicated by the items 22 listed in the customer's field 20. The competitor's field 18 may list items 22 that are indicative of companies that compete with the focal item 14 in the marketplace. Although FIG. 1 uses the parameter of revenue to determine the items to be listed in the supplier's and customer's fields 16, 20, other variations of the interface 10 may be different parameters such as, for example, price-to-earnings ratio, inventory level, debt-to-equity ratio, etc.

Certain of the items 22 (that is, all of the items 22 or less than all of the items 22) in the additional fields 16, 18, 20 may further have associated indicia of the quantity of the parameter defining the relationships. For example, where the parameter is revenue, as shown in the example of FIG. 1, certain of the items 22 in the supplier's field 16 may have associated indicia 30 indicative of how much revenue the items 22 derive from sales to the focal item 14. The indicia 30 may be, for example, a number, a graphical representation and/or a color-coded representation. In FIG. 1, graphical representations, specifically pie slices, are used as the indicia 30. For example, the interface 10 may include a key 25 showing the meaning of, for example, the graphical and/or color-coded representations. With reference to the key 25 in FIG. 1, company DDD may receive greater than 75% of its revenue from ABC Corp. (the focal item 14), company DDE may receive 50-75% of its revenue from ABC Corp., company DDF may receive 25-50% of its revenue from ABC Corp., and companies DDG and DDH may receive 10-25% of their revenue from ABC Corp. The companies indicated by the other items 22 in field 16 (such as DDJ, DDK, etc.) may receive less than 10% of their revenue from ABC in this example. According to various embodiments, the pie slices may be of different colors to provide a more perspicuous indication of the relationship.

Certain of the items 22 may contain hyperlinks that, when activated by the user, generate a new display with the item 22 corresponding to the activated hyperlink in the field 12 as the new focal item 14. The additional fields 16, 18, 20 would then be populated with items appropriately related to the new focal item 14. For example, with reference to FIG. 1, if the user activated the hyperlink for supplier "SDF," a new display would be generated with "SDF" in the field 12 as the new focal item 14, with the fields 16, 18, 20 listing suppliers, competitors and customers of the company corresponding to the symbol "SDF," respectively, as shown in FIG. 2.

Figure 3:
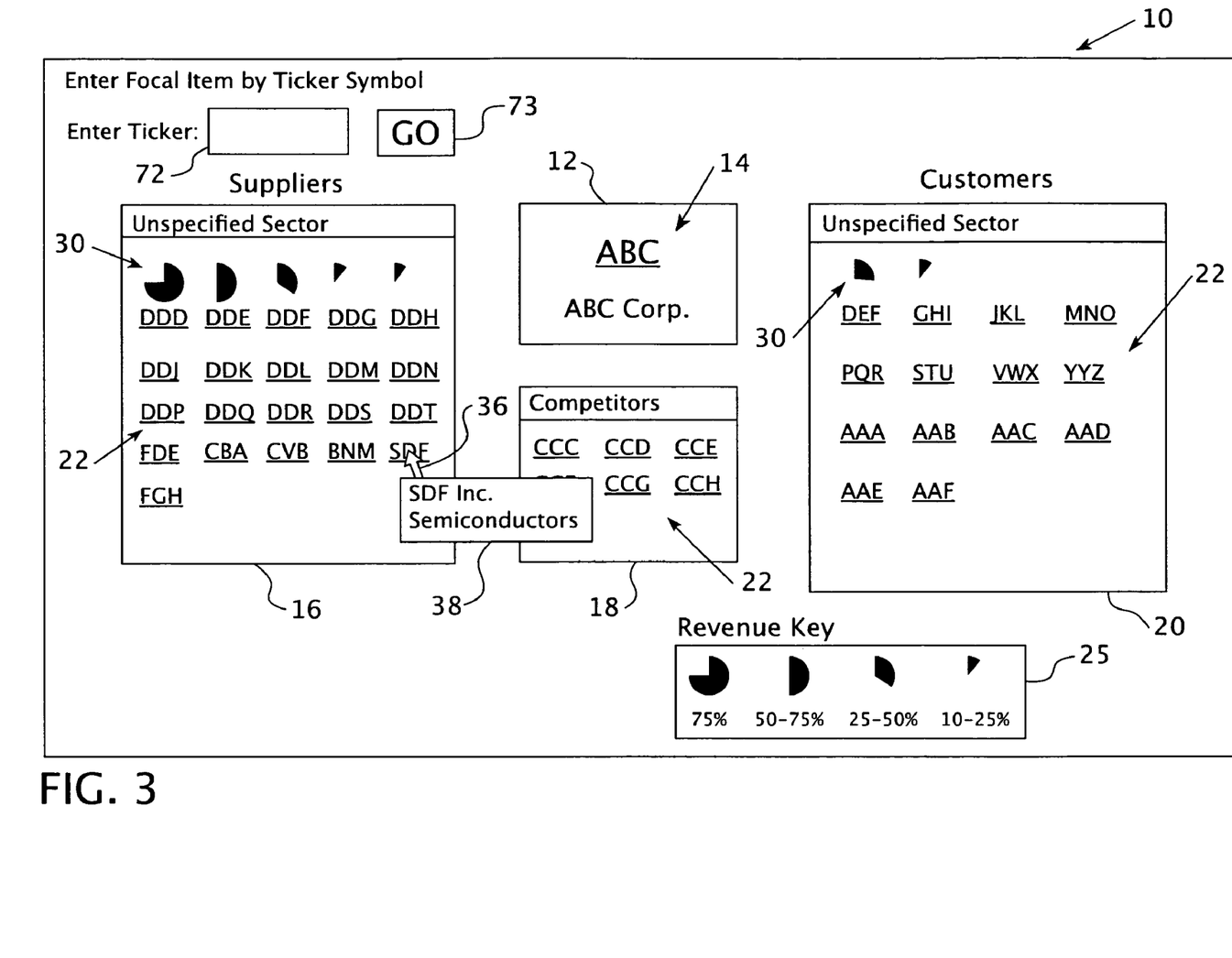

In addition, certain of the items 22 may have an associated mouseover, such that when the user passes the cursor 36 near the item 22 on the display 10, a display window 38 containing additional information about the company indicated by the item 22 is displayed to the user, such as shown in FIG. 3. The additional information may include, for example, the full name of the company, its industry sector(s), its market capitalization, etc.

Figure 2:
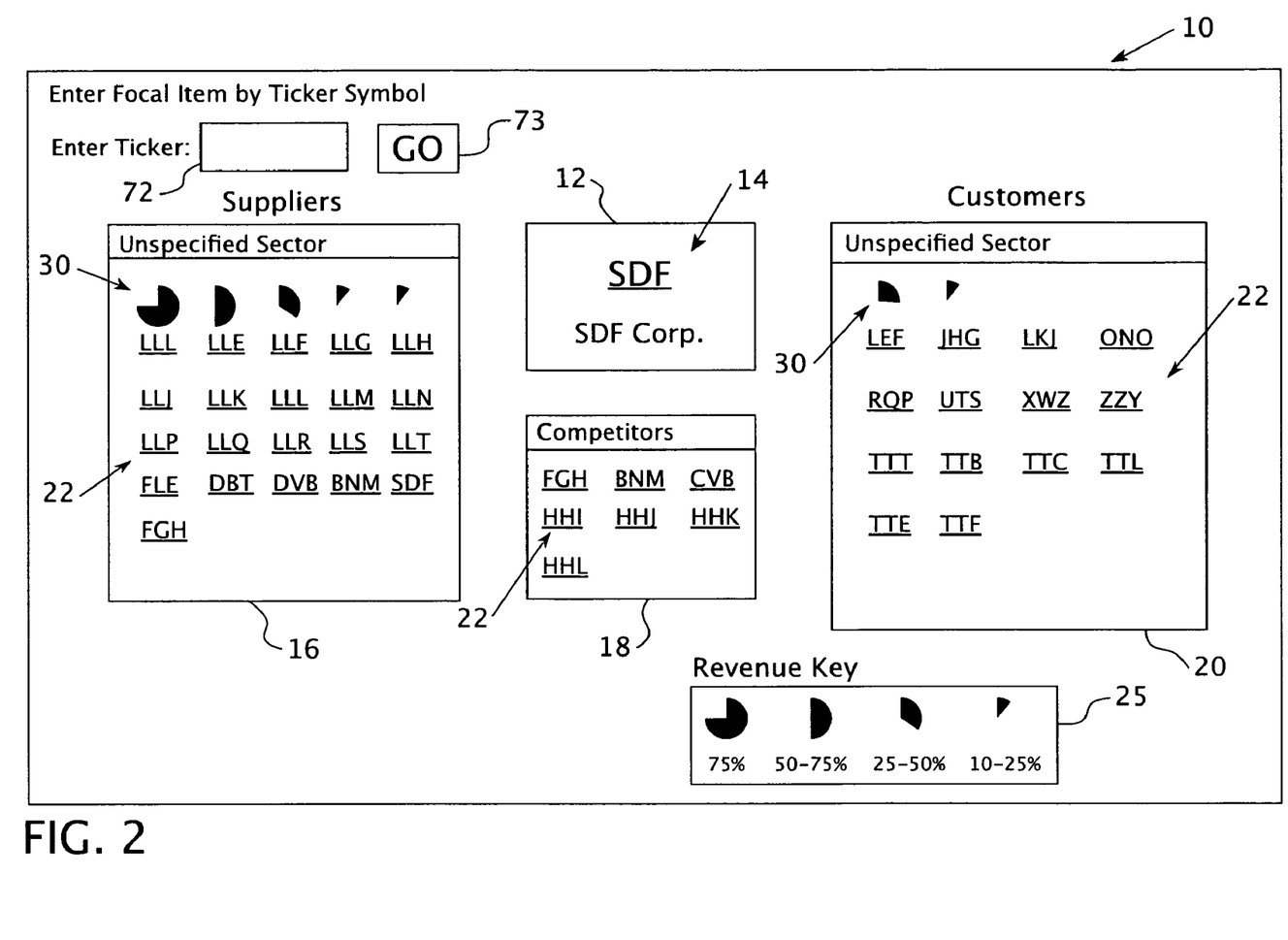

Also, as illustrated in FIGS. 1-3, the user interface 10 may include a focal item input field 72 where the user could type in an identifier for new focal item. For example, according to one embodiment, the identifier could be the stock trading symbol for a company or an abbreviation for an economic indicator (such as GNP, etc.). In this way, rather than activating one of the hyperlinks for one of the items 22 in one of the fields 16, 18 or 20 to be the new focal item, the user could instead type in the symbol for the new focal item in the field 72. When the user clicks on the activation button 73 or hits the "Enter" key on its keyboard, a new page would be displayed for the user with the new focal item 14 in the field 12 and with, for example, the suppliers, competitors and customers of the new focal item 14 listed in the fields 16, 18, 20 respectively.

As mentioned previously, the focal item 14 may be an economic parameter, such as GNP, CPI, etc. When the focal item 14 is such an economic parameter, one of the additional fields 16, 18, 20 may list items 22 representing companies that are heavily affected by that particular economic parameter. For example, the additional field may include a list of companies whose stock price is known to change in response to changes in the particular economic indicator.

In this way, users may interactively, quickly and perspicuously navigate through a company's supply chain and see key interdependencies and relationships between the spectrum of participants. For example, the user could navigate through three or more derivatives up, down or across a supply chain quickly to discern the impact of market moves on players several orders down or upstream. With reference to the example of FIG. 1, the user may quickly discern that company DDD (in field 16) derives a significant portion of its revenues from ABC Corp. (the focal item 14). Thus, for example, if ABC Corp. happened to announce that it was entering bankruptcy, the user would know immediately that the continued revenue stream of company DDD may be impaired. This is but one example of the type of information, critically important to investors, that could be discerned using an interactive user interface as described herein.

Figure 4:
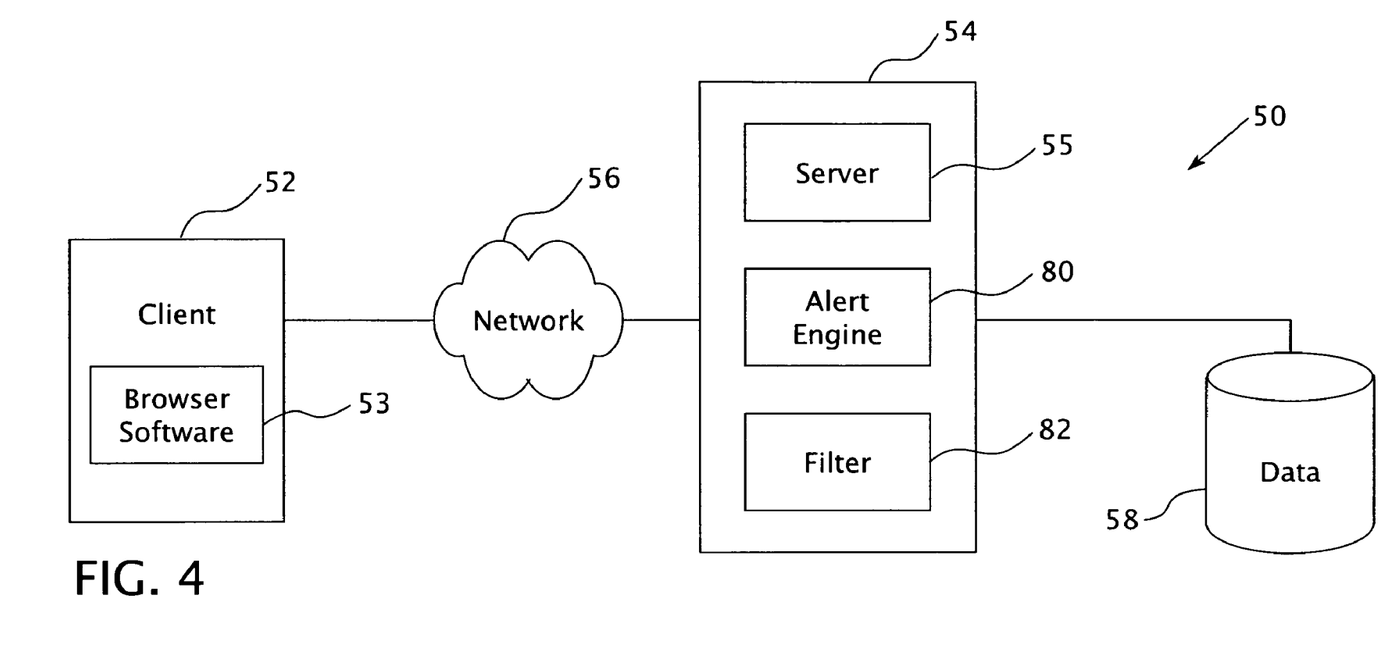
FIG. 4 is a diagram of a system according to various embodiments of the present invention.

The interactive user interface 10 may be implemented, in various embodiments, in a web environment. FIG. 4 is a diagram of such a system 50 according to various embodiments. The user may view the interface 10 at a client device 52, which may include web browser software 53 for displaying web pages. The client device 52 may be any type of device capable of receiving, rendering and displaying web pages such as, for example, a portable computer (PC), a laptop computer, a workstation, a web-enabled telephone, etc. The interactive user interface 10 may be part of a web page served to the client device 52 from a host computing device 54 (referred to hereinafter as the "host") through a network 56. The host 54, which is shown as a single device in FIG. 4 but which may be embodied as a series of networked computing devices, may include a server 55 for generating the web pages of the interface 10 based on data stored in a database 58. The server 55 may serve the generated web pages via the network 56 to the client device 52.

According to various embodiments, the database 58 may include model data that is tagged and extracted from numerous analysts' models of companies, but publicly traded and privately held. This data may be processed to gather the customer-supplier relationships, etc. to be shown on the interactive interface 10. The database 58 may utilize XBRL (Extensible Business Reporting Language) data. The data may also be validated. In addition, data from other sources may be included in the database 58. Such additional sources include SEC data (e.g., Edgar Online data) and data from subscription data services. The data from these additional data sources may also be validated.

Figure 5:
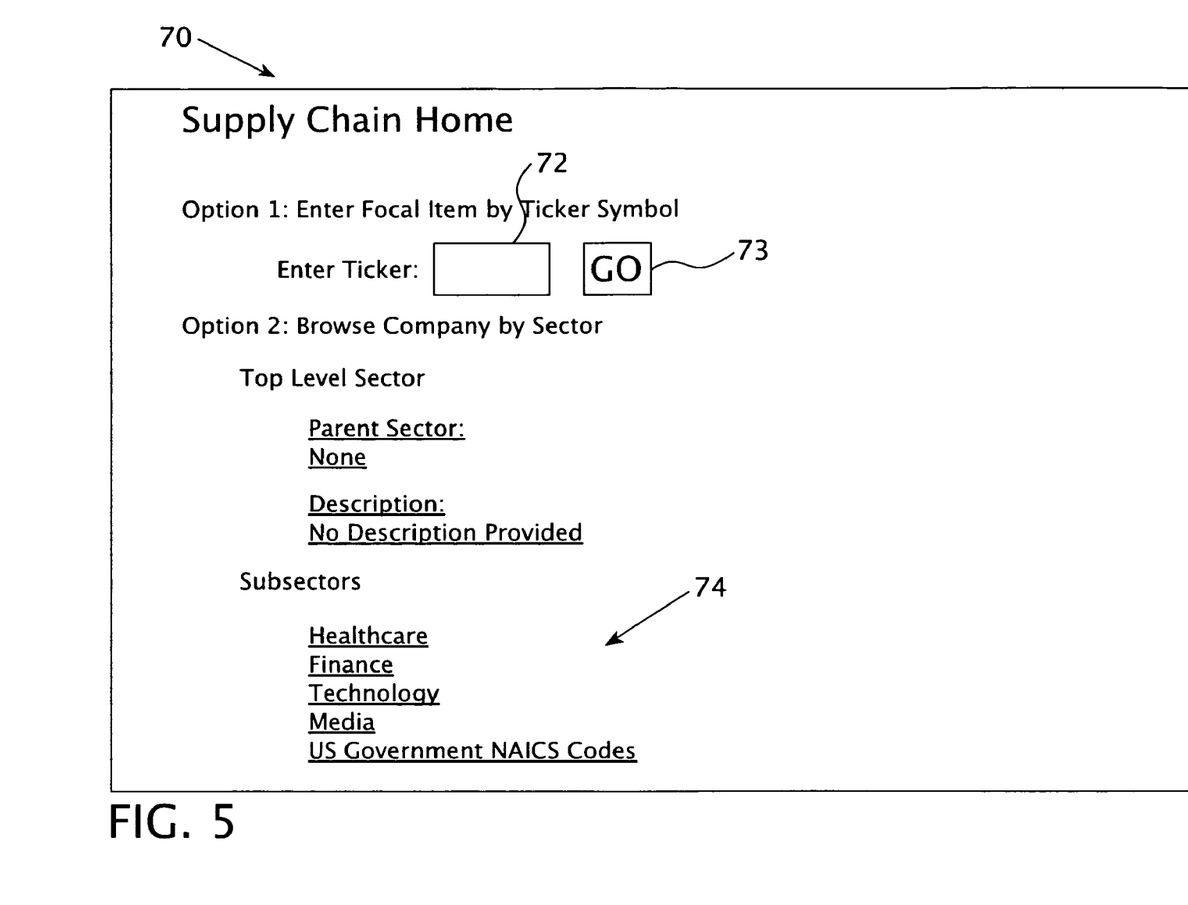

As mentioned previously, the user may enter the focal item 14 (see FIG. 1), or it may select the focal item in response to a search query or a drill down through a hierarchy of industry sector-related folders. FIG. 5 illustrates an example of an interactive user interface 70 through which a user may enter the focal item 14 (see FIG. 1) according to various embodiments of the present invention. For the example illustrated in FIG. 5, the user may type in the ticker symbol or economic indicator abbreviation for the focal item 14 in the focal item input field 72. Alternatively, the user may drill down through sector folders 74 to enter the focal item 14. Once the focal item is selected, an interactive user interface as shown in FIG. 1 may be displayed for the user.

Referring back to FIG. 4, the host 54 may also include an alert engine 80 and a filter 82. The alert engine 80 and filter 82 may be implemented as software code to be executed by a processor(s) (not shown) of the host 54 using any type of computer instruction type suitable, such as, for example, Java, C, C++, Visual Basic, etc., using, for example, conventional or object-oriented techniques. The software code may be stored as a series of instructions or commands on a computer readable medium, such as a random access memory (RAM), a read only memory (ROM), a magnetic medium such as a hard drive or a floppy disk, or an optical medium such as a CD-ROM.

The alert engine 80 may receive alerts generated by applications (not shown). The alerts may be messages indicating that some type of predetermined event has occurred. The user, via the client device 52, may set criteria that establish the type of alerts to be generated. For example, the user may set criteria such that if the stock price for a particular company changes by more than 5% during one trading day, an alert is generated. The alert engine 80 may receive the generated alerts and route them to the appropriate users. The alerts may be, for example, messages sent via the network 56 to the user's client device 52.

The filter 82 may filter data from the database 58 to be displayed on the interactive display 10. For example, with reference to FIG. 1, field 16 contains a listing of companies that receive revenue through sales to the focal company (focal item 14). Instead of listing every company in the database 58 that is known to receive revenue from the focal company, the filter 82 may filter out all companies that receive less than a threshold percentage (such as 1%, 2%, 5%, etc.) of their revenue from the focal company. Similarly, the filter 82 may filter out companies for the customer field 20 from which the focal company receives less than a threshold percentage of its revenue. According to various embodiments, the user may select the threshold percentage or an administrator of the host 54 may set the threshold values.

Various embodiments of the present invention are also directed to a method of presenting data in an interactive user interface to a user. The method may include displaying a first page with the interactive user interface 10, such as shown in FIG. 1, to the user. The page may be served as part of a document served to the user's client device 52 by the server 55 of the host 54 (see FIG. 4). The method may also include displaying a second page to the user when one of the hyperlinks contained in any of the fields 16, 18, 20 is activated by the user. In the second page, the item corresponding to the activated hyperlink may be the new focal item 14 in the field 12, as shown in FIG. 2. As such, the fields 16, 18, 20 may list items related to the new focal item 14. Further, the items in fields 16, 18, 20 in the second page may also have associated hyperlinks and mouseovers, just like the first page. The user may interactively navigate through the supply chain by continually repeating this process, selecting different items (e.g., companies or economic indicators) to be the new focal item.

While several embodiments of the present invention have been described herein, it should be apparent that various modifications, alterations and adaptations to those embodiments may occur to persons skilled in the art. It is therefore intended to cover all such modifications, alterations and adaptations without departing from the scope and spirit of the present invention as defined by the appended claims.

What is claimed is:

1. A computer-implemented interactive user interface on a computer display, comprising:
   a first field including a focal company identifier that identifies a focal company; and
   a second field including supplier company identifiers that identify companies that are suppliers to the focal company that receive a threshold percentage of their revenue from the focal company, wherein at least one supplier company identifier is associated with a supplier level indicator that indicates a percentage range of revenue received by the company identified by the at least one supplier company identifier from the focal company, and wherein certain of the supplier company identifiers in the second field are associated with a hyperlink that, when activated by the user, causes the supplier company identifier corresponding to the activated hyperlink to become a new focal company identified in the first field, such that the second field transitions to include supplier company identifiers that identify companies that are suppliers to the new focal company that receive a threshold percentage of their revenue from the new focal company.

2. The interactive user interface of claim 1, wherein the interface includes a focal company input field in which a user may input an identifier for a new focal company.

3. The interactive user interface of claim 1, wherein the supplier level indicator includes a graphical representation or a color-coded representation.

4. The interactive user interface of claim 1, wherein the focal company identifier comprises a stock trading ticker symbol of the focal company.

5. The interactive user interface of claim 1, further comprising a third field including customer company identifiers that identify companies that are customers of the focal company and from which the focal company receives a threshold percentage of its revenue.

6. The interactive user interface of claim 1, further comprising a third field including competitor company identifiers that identify companies that are competitors of the focal company.

7. The interactive user interface of claim 1, wherein certain of the supplier company identifiers in the second field are associated with a mouseover such that, when a user maintains a cursor near a selected one of the certain supplier company identifiers for a sufficient time period, additional information about the selected supplier company is presented to the user.

8. A computer-implemented interactive user interface on a computer display, comprising:

a first field including a focal company identifier that identifies a focal company;

a second field including supplier company identifiers that identify companies that are suppliers to the focal company that receive a threshold percentage of their revenue from to the focal company, wherein at least one supplier company identifier is associated with a supplier level indicator that indicates a percentage range of revenue received by the supplier company identified by at least one supplier company identifier from the focal company;

a third field including customer company identifiers that identify companies that are customers of the focal company from which the focal company receives a threshold percentage of its revenue, and wherein at least one customer company identifier is associated with a customer level indicator that indicates a percentage range of revenue received by the focal company from the customer company identified by the at least one customer company identifier; and a fourth field including competitor company identifiers that identify companies that are competitors of the focal company, wherein certain of the companies identifiers in the second, third and fourth fields are associated with a hyperlink that, when activated by the user, causes the company identifier corresponding to the activated hyperlink to become a new focal company identifier in the first field that identifies a new focal company, such that:

the second field transitions to include new supplier company identifiers that identify companies that are suppliers of the new focal company;

the third field transitions to include new customer company identifiers that identify companies that are customers of the new focal company; and the fourth field transitions to include new competitor company identifiers that identify companies that are competitors of the new focal company.

9. The interactive user interface of claim 8, wherein certain of the company identifiers in the second, third and fourth fields are associated with a mouseover such that, when a user maintains a cursor near a selected one of the company identifiers for a sufficient time period, additional information about the selected company is presented to the user.

10. The interactive user interface of claim 8, wherein the supplier indicator includes a graphical representation or a color-coded representation.

11. The interactive user interface of claim 8, wherein the interface includes a focal company input field in which a user may input the focal company identifier for a new focal company.

12. A computer-implemented system for providing an interactive user interface to a user, the system comprising:

a server for serving a document containing the interactive user interface via a network to the user, the interactive user interface including:

a first field including a focal company identifier that identities a focal company; and a second field including supplier company identifiers that identify companies that are suppliers to the focal company that receive a threshold percentage of their revenue from the focal company, wherein at least one supplier company identifier is associated with a supplier level indicator that indicates a percentage range of revenue received by a supplier company identified by the at least one supplier company identifier from the focal company, and wherein certain of the supplier company identifiers are associated with a hyperlink that, when activated by the user, causes the supplier company identifier corresponding to the activated hyperlink to become a new focal company identifier listed in the first field, such that the second field transitions to include new supplier company identifiers that identify companies that are suppliers to the new focal company that receive a threshold percentage of their revenue from the new focal company; and a database in communication with the server for storing data about the companies.

13. The system of claim 12, further comprising an alert engine in communication with the database for sending an alert message via the network to the user.

14. The system of claim 12, wherein the focal company identifier comprises a stock trading ticker symbol of the focal company.

15. The system of claim 12, further comprising a third field that includes customer company identifiers that identify companies that are customers of the focal company from which the focal company receives a threshold percentage of its revenue.

16. The system of claim 12, further comprising a third field including competitor company identifiers that identify companies that are competitors of the focal company.

17. The system of claim 12, wherein the document further includes a focal company identifier input field in which a user may input the focal company identifier for a new focal company.

18. A method of presenting data in an interactive user interface, comprising:

displaying a first page including:

a first field including a focal company identifier that identifies a focal company;

a second field including supplier company identifiers that identify companies that are suppliers to the focal company that receive a threshold percentage of their revenue from the focal company, wherein at least one supplier company identifier is associated with a supplier level indicator that indicates a percentage range of revenue received by the supplier company identified by the at least one supplier company identifier from the focal company, and wherein certain of the supplier company identifiers in the second field are associated with a hyperlink; and displaying a second page, when one of the hyperlinks of the first page is activated, wherein the second page includes:

in the first field, a new focal company identifier for a new focal company corresponding to the supplier company identifier associated with the activated hyperlink; and in the second field, new supplier company identifiers that identify companies that are suppliers to the new focal company and that receive a threshold percentage of their revenue from the new focal company, wherein certain of the new supplier company identifiers in the second field on the second page are associated with a hyperlink.

19. The method of claim 18, wherein the suppler level indicator includes a graphical representation or a color-coded representation.

20. The method of claim 18, wherein the focal company identifier comprises a stock trading ticker symbol of the focal company.

21. The method of claim 18, wherein the first page further comprises a third field including customer company identifiers that identify companies that are customers of the focal company from which the focal company receives a threshold percentage of its revenue, and wherein at least one customer company identifier is associated with a customer level indicator indicating a percentage range of revenue received by the focal company from the company identified by the at least one customer company identifier.

22. The method of claim 21, wherein the first page further comprises a fourth field including competitor company identifiers that identify companies that are competitors of the focal company.

23. The method of claim 18, wherein each of the first and second pages further include a focal company identifier input field in which a user may input a focal company identifier for a new focal company.

24. A computer-implemented interactive user interface on a company display, comprising:
    a first field identifying a focal item; and
    a second field including company identifiers that identify companies related to the focal item, wherein certain of the companies identifiers in the second field are associated with a hyperlink that, when activated by the user, causes the company identifier corresponding to the activated hyperlink to become a new focal item identified in the first field, such that the second field transitions to include company identifiers that identify companies related to the new focal item,
    wherein the focal item includes one of an identifier for a company or an identifier of an economic indicator; and
    the second field includes:
        when the focal item is an identifier for a company, company identifiers for companies that are suppliers of the focal item; and
        when the focal item is an identifier of an economic indicator, company identifiers for companies whose stock price is known to change with changes to the economic indicator.

25. A computer-implemented system for providing an interactive user interface to a user, the system comprising:
    a server for serving a document containing the interactive user interface via a network to the user, the interactive user interface including:
        a first field identifying a focal item; and
        a second field including company identifiers that identify companies related to the focal item, wherein certain of the company identifiers in the second field are associated with a hyperlink that, when activated by the user, causes the company identifier corresponding to the activated hyperlink to become a new focal item listed in the first field, such that the second field transitions to include company identifiers that identify companies related to the new focal item; and
    a database in communication with the server for storing data about the companies,
    wherein the focal item includes one of an identifier for a company or an identifier of an economic indicator; and
    the second field includes:
        when the focal item is an identifier for a company, company identifiers for companies that are suppliers of the focal item; and
        when the focal item is an identifier of an economic indicator, company identifiers for companies whose stock price is known to change with changes to the economic indicator.

26. A computer-implemented method of presenting data in an interactive user interface, comprising:
    displaying a first page including:
        a focal item in a first field;
        a second field including company identifiers that identify companies related to the focal item, wherein certain of the company identifiers in the second field are associated with a hyperlink; and
    displaying a second page, when one of the hyperlinks of the second field of the first page is activated, wherein the second page includes:
        in the first field, an identifier for the company corresponding to the activated hyperlink as a new focal item; and
        in the second field, a listing of new company identifiers that identify companies related to the new focal item, wherein certain of the new company identifiers in the second page are associated with a hyperlink,
    wherein the focal item includes one of an identifier for a company or an identifier of an economic indicator; and
    the second field includes:
        when the focal item is an identifier for a company, company identifiers for companies that are suppliers of the focal item; and
        when the focal item is an identifier of an economic indicator, company identifiers for companies whose stock price is known to change with changes to the economic indicator.

27. A computer-implemented interactive user interface on a computer display, comprising:
    a first field including a focal company identifier that identifies a focal company; and
    a second field including supplier company identifiers that identify companies that are customers of the focal company and from which the focal company receives a threshold percentage of its revenue, wherein at least one customer company identifier in the second field is associated with a customer level indicator that indicates a percentage range of revenue received by the focal company from the company identified by the at least one customer company identifier, and wherein certain of the customer company identifiers in the second field are associated with a hyperlink that, when activated by the user, causes the customer company identifier corresponding to the activated hyperlink to become a new focal company identified in the first field, such that the second field transitions to included customer company identifiers that identify companies that are a customer of the new focal company and from which the new focal company receives a threshold percentage of its revenue.

28. A computer-implemented system for providing an interactive user interface to a user, the system comprising:
    a server for serving a document containing the interactive user interface via a network to the user, the interactive user interface including:
        a first field including a focal company identifier that identifies a focal company; and
        a second field including supplier company identifiers that identify companies that are customers of the focal company and from which the focal company receives a threshold percentage of its revenue, wherein at least one customer company identifier is associated with a customer level indicator that indicates a percentage range of revenue received by the focal company from the company identified by the at least one customer company identifier, and wherein certain of the customer company identifiers in the second field are associated with a hyperlink that, when activated by the user, causes the customer company identifier corresponding to the activated hyperlink to become a new focal company identified in the first field, such that the second field transitions to include customer company identifiers that identify companies that are customers of the new focal company and from which the new focal company receives a threshold percentage of its revenue; and a database in communication with the server for storing data about the companies.

29. The interactive user interface of claim 1, wherein the second field comprises first and second supplier level indicators that indicate a percentage range of revenue received by certain companies identified by the supplier company identifiers included in the second field, wherein the first supplier level indicator corresponds to a first percentage revenue range and the second supplier level indicator corresponds to a second percentage revenue range.

30. The interactive user interface of claim 8, wherein the second field comprises first and second supplier level indicators that indicate the percentage range of revenue received by certain companies identified by the supplier company identifiers in the second field, wherein the first supplier level indicator corresponds to a first percentage revenue range and the second supplier level indicator corresponds to a second percentage revenue range.

31. The system of claim 12, wherein the second field comprises first and second supplier level indicators that indicate the percentage range of revenue received by certain companies identified by the supplier company identifiers in the second field, wherein the first supplier level indicator corresponds to a first percentage revenue range and the second supplier level indicator corresponds to a second percentage revenue range.

32. The method of claim 18, wherein the second field comprises first and second supplier level indicators that indicate the percentage range of revenue received by certain companies identified by the supplier company identifiers in the second field, wherein the first supplier level indicator corresponds to a first percentage revenue range and the second supplier level indicator corresponds to a second percentage revenue range.

33. The interface of claim 27, wherein the second field comprises first and second customer level indicators that indicate the percentage range of revenue received by the focal company from certain companies identified by the customer company identifiers in the second field, wherein the first customer level indicator corresponds to a first percentage revenue range and the second customer level indicator corresponds to a second percentage revenue range.

34. The method of claim 28, wherein the second field comprises first and second customer level indicators that indicate the percentage range of revenue received by the focal company from certain companies identified by the customer company identifiers in the second field, wherein the first customer level indicator corresponds to a first percentage revenue range and the second customer level indicator corresponds to a second percentage revenue range.

35. A computer-implemented interactive user interface on a computer display, comprising:
a first field identifying a focal item; and
a second field including company identifiers that identify companies related to the focal item, wherein certain of the companies identifiers in the second field are associated with a hyperlink that, when activated by the user, causes the company identifier corresponding to the activated hyperlink to become a new focal item identified in the first field, such that the second field transitions to include company identifiers that identify companies related to the new focal item,
wherein the focal item includes one of an identifier for a company or an identifier of an economic indicator; and
the second field includes:
when the focal item is an identifier for a company, company identifiers for companies that are customers of the focal item; and
when the focal item is an identifier of an economic indicator, company identifiers for companies whose stock price is known to change with changes to the economic indicator.

36. A computer-implemented system for providing an interactive user interface to a user, the system comprising:
a server for serving a document containing the interactive user interface via a network to the user, the interactive user interface including:
a first field identifying a focal item; and
a second field including company identifiers that identify companies related to the focal item, wherein certain of the company identifiers in the second field are associated with a hyperlink that, when activated by the user, causes the company identifier corresponding to the activated hyperlink to become a new focal item listed in the first field, such that the second field transitions to include company identifiers that identify companies related to the new focal item; and
a database in communication with the server for storing data about the companies,
wherein the focal item includes one of an identifier for a company or an identifier of an economic indicator; and
the second field includes:
when the focal item is an identifier for a company, company identifiers for companies that are customers of the focal item; and
when the focal item is an identifier of an economic indicator, company identifiers for companies whose stock price is known to change with changes to the economic indicator.

37. A computer-implemented method of presenting data in an interactive user interface, comprising:
displaying a first page including:
a focal item in a first field:
a second field including company identifiers that identify companies related to the focal item, wherein certain of the company identifiers in the second field are associated with a hyperlink; and
displaying a second page, when one of the hyperlinks of the second field of the first page is activated, wherein the second page includes:
in the first field, the company identifier corresponding to the activated hyperlink as a new focal item; and
in the second field, company identifiers that identify companies related to the new focal item, wherein certain of the company identifiers in the second field are associated with a hyperlink,
wherein the focal item includes one of an identifier for a company or an identifier of an economic indicator; and
the second field includes:
when the focal item is an identifier for a company, company identifiers for companies that are customers of the focal item; and when the focal item is an identifier of an economic indicator, company identifiers for companies whose stock price is known to change with changes to the economic indicator.

38. A computer-implemented interactive user interface on a computer display, comprising:
   a first field identifying a focal item; and
   a second field including company identifiers that identify companies related to the focal item, wherein certain of the company identifiers are associated with a hyperlink that, when activated by the user, causes the company identifier corresponding to the activated hyperlink to become a new focal item in the first field, such that the second field transitions to include company identifiers that identify companies related to the new focal item,
   wherein the focal item includes one of an identifier for a company or an identifier of an economic indicator; and
   the second field includes:
      when the focal item is an identifier for a company, company identifiers for companies that are competitors of the focal item; and
      when the focal item is an identifier of an economic indicator, company identifiers for companies whose stock price is known to change with changes to the economic indicator.

39. A computer-implemented system for providing an interactive user interface to a user, the system comprising:
   a server for serving a document containing the interactive user interface via a network to the user, the interactive user interface including:
      a first field identifying a focal item; and
      a second field including company identifiers that identify companies related to the focal item, wherein certain of the company identifiers are associated with a hyperlink that, when activated by the user, causes the company identifier corresponding to the activated hyperlink to become a new focal item in the first field, such that the second field transitions to include company identifiers that identify companies related to the new focal item; and
   a database in communication with the server for storing data about the companies,
   wherein the focal item includes one of an identifier for a company or an identifier of an economic indicator; and
   the second field includes:
      when the focal item is an identifier for a company, company identifiers for companies that are competitors of the focal item; and
      when the focal item is an identifier of an economic indicator, company identifiers for companies whose stock price is known to change with changes to the economic indicator.

40. A computer-implemented method of presenting data in an interactive user interface, comprising:
   displaying a first page including:
      a focal item in a first field;
      a second field including company identifiers that identify companies related to the focal item, wherein certain of the company identifiers are associated with a hyperlink; and
   displaying a second page, when one of the hyperlinks of the second field of the first page is activated, wherein the second page includes:
      in the first field, the company identifier corresponding to the activated hyperlink as a new focal item; and
      in the second field, new company identifiers that identify companies related to the new focal item, wherein certain of the new company identifiers are associated with a hyperlink,
   wherein the focal item includes one of an identifier for a company or an identifier of an economic indicator; and
   the second field includes:
      when the focal item is an identifier for a company, company identifiers for companies that are competitors of the focal item; and
      when the focal item is an identifier of an economic indicator, company identifiers for companies whose stock price is known to change with changes to the economic indicator.

41. The interface of claim 5, further comprising a fourth field including competitor company identifiers that identify companies that are competitors of the focal company.

42. The system of claim 15, further comprising a fourth field including competitor company identifiers that identify companies that are competitors of the focal company.

43. The method of claim 18, wherein the first page further comprises a third field including competitor company identifiers that identify companies that are competitors of the focal company.

44. The interface of claim 27, further comprising a third field including competitor company identifiers that identify companies that are competitors of the focal company.

45. The system of claim 28, further comprising a third field including competitor company identifiers that identify companies that are competitors of the focal company.

46. A computer-implemented method of presenting data in an interactive user interface, comprising:
   displaying a first page including:
      a first field including a focal company identifier that identifies a focal company;
      a second field including customer company identifiers that identify companies that are customers of the focal company and from which the focal company receives a threshold percentage of its revenue, wherein at least one customer company identifier in the second field is associated with an customer level indicator that indicates a percentage range of revenue received by the focal company from company identified by the at least one customer company identifier, and wherein certain of the company identifiers in the second field are associated with a hyperlink; and
   displaying a second page, when one of the hyperlinks of the first page is activated, wherein the second page includes:
      in the first field, a new focal company identifier for a new focal company corresponding to the customer company identifier associated with the activated hyperlink; and
      in the second field, new customer company identifiers that identify companies that are customers of the new focal company and from which the new focal company receives a threshold percentage of its revenue, wherein certain of the new customer company identifiers are associated with a hyperlink.

* * * * *

UNITED STATES PATENT AND TRADEMARK OFFICE
CERTIFICATE OF CORRECTION

PATENT NO.        : 7,376,912 B2                                           Page 1 of 1
APPLICATION NO.   : 10/809776
DATED             : May 20, 2008
INVENTOR(S)       : Barry Hurewitz and Vaughn Harvey It is certified that error appears in the above-identified patent and that said Letters Patent is hereby corrected as shown below:

Column 7, Line 59, delete "identities a focal company" and substitute therefor --identifies a focal company--.

Column 10, Line 33, delete "including supplier company" and substitute therefor --including customer company--.

Column 10, Line 47, delete "transitions to included customer" and substitute therefor --transitions to include customer--.

Column 10, Line 59, delete "including supplier company" and substitute therefor --including customer company--.

Signed and Sealed this

Twentieth Day of January, 2009

JON W. DUDAS
*Director of the United States Patent and Trademark Office*